(12) United States Patent
Barkalow et al.

(10) Patent No.: US 8,685,474 B2
(45) Date of Patent: Apr. 1, 2014

(54) NON-CRYSTALLIZING SYRUPS CONTAINING SORBITOL AND THEIR USE IN CHEWING GUM

(75) Inventors: David G. Barkalow, Deerfield, IL (US); Miguel A. Soto, Chicago, IL (US); Michael A. Reed, Merrillville, IN (US)

(73) Assignee: Wm. Wrigley Jr. Company, Chicago, IL (US)

( * ) Notice: Subject to any disclaimer, the term of this patent is extended or adjusted under 35 U.S.C. 154(b) by 2358 days.

(21) Appl. No.: 11/673,890

(22) Filed: Feb. 12, 2007

(65) Prior Publication Data

US 2007/0196534 A1 Aug. 23, 2007

Related U.S. Application Data

(60) Provisional application No. 60/773,525, filed on Feb. 15, 2006, provisional application No. 60/778,674, filed on Mar. 2, 2006.

(51) Int. Cl.
*A23G 4/18* (2006.01)
*A23G 3/50* (2006.01)
*A23L 1/236* (2006.01)

(52) U.S. Cl.
USPC ................................ 426/5; 426/104; 426/548

(58) Field of Classification Search
USPC ............................................. 426/104, 548, 5
See application file for complete search history.

(56) References Cited

U.S. PATENT DOCUMENTS

| | | | |
|---|---|---|---|
| 3,857,965 A | 12/1974 | Ream | |
| 4,156,740 A | 5/1979 | Glass et al. | |
| 4,238,510 A | 12/1980 | Cherukuri et al. | |
| 4,271,197 A * | 6/1981 | Hopkins et al. | 426/3 |
| 4,382,962 A | 5/1983 | Devos et al. | |
| 4,423,086 A | 12/1983 | Devos et al. | |
| 4,466,983 A | 8/1984 | Cifrese et al. | |
| 4,671,961 A | 6/1987 | Patel et al. | |
| 4,671,967 A | 6/1987 | Patel et al. | |
| 4,728,515 A | 3/1988 | Patel et al. | |
| 4,753,790 A | 6/1988 | Silva et al. | |
| 4,800,095 A | 1/1989 | Carroll et al. | |
| 5,120,551 A | 6/1992 | Yatka et al. | |
| 5,286,500 A | 2/1994 | Synosky et al. | |
| 5,637,334 A | 6/1997 | Yatka et al. | |
| 5,651,936 A | 7/1997 | Reed et al. | |
| 6,017,567 A | 1/2000 | Rosenplenter | |
| 2004/0234648 A1 | 11/2004 | Mazurek et al. | |

FOREIGN PATENT DOCUMENTS

| | | |
|---|---|---|
| EP | 0 273 856 A1 | 7/1988 |
| WO | WO 81/01100 A1 | 10/1980 |
| WO | WO 97/01962 A1 | 1/1997 |
| WO | WO 97/22263 A1 | 6/1997 |
| WO | WO 2007/095494 A2 | 8/2007 |

* cited by examiner

*Primary Examiner* — Humera Sheikh
*Assistant Examiner* — Bhaskar Mukhopadhyay
(74) *Attorney, Agent, or Firm* — Steven P. Shurtz; Brinks Gilson & Lione

(57) ABSTRACT

An aqueous syrup for use in chewing gum, particularly pellet gum, comprises, on a dry basis, greater than about 98% polyols, of which i) about 50% to about 90% is sorbitol, ii) about 3% to about 30% is maltitol, iii) about 2% to about 20% are polyols, other than sorbitol and maltitol, with a degree of polymerization (DP) of 1 or 2, and iv) less than about 20% (and perhaps less than about 12%) are polyols with a DP of 3 or greater. The syrup is made with less than about 1.0% plasticizing agent, such as glycerin or propylene glycol. The syrup contains less than 5% water. The syrup can be made by evaporating a mixture of a sorbitol solution, a maltitol syrup and one or more polyols selected from the group consisting of mannitol, xylitol, lactitol, erythritol, hydrogenated isomaltulose, and combinations thereof. Methods of using the syrup to make chewing gum, and chewing gum products containing the syrup are also provided.

11 Claims, No Drawings

NON-CRYSTALLIZING SYRUPS CONTAINING SORBITOL AND THEIR USE IN CHEWING GUM

RELATED APPLICATION

The present application claims the benefit under 35 U.S.C. §119(e) of 1) Provisional U.S. Patent Application Ser. No. 60/773,525, filed Feb. 15, 2006; and 2) Provisional U.S. Patent Application Ser. No. 60/778,674, filed Mar. 2, 2006, both of which are hereby incorporated by reference in their entirety.

BACKGROUND

The present invention relates generally to chewing gum products and syrups used to make chewing gum products. More specifically, the present invention relates to chewing gum compositions including sorbitol used to make pellet gum.

It is known to include polyols, such as sorbitol, mannitol, xylitol, and other hydrogenated oligosaccharides, in chewing gum products. Polyols can be used in chewing gum as a "sugar substitute." These sugar substitutes have the advantage that they are not fermented in the mouth of the consumer to form products that can attack dental enamel. Therefore, sorbitol, as well as other polyols, are generally used in sugarless products. Additionally, sorbitol can be used as a bulking agent.

Sorbitol can be provided in chewing gum in its crystalline form. It is believed that crystalline sorbitol currently accounts for approximately 50% of typical sugarfree chewing gum formulations. Unfortunately, crystalline sorbitol is costly. Although it would be desirable to have a replacement for crystalline sorbitol, heretofore, such possible replacements were not as effective, created product stability problems, created processability issues, were even more expensive than crystalline sorbitol, and/or could not be used with certain formulations.

In this regard, aqueous sorbitol has been explored for use in chewing gum. Sorbitol in an aqueous solution is a less expensive alternative, on a dry basis, than crystalline sorbitol. Unfortunately, the use of aqueous sorbitol in chewing gum at levels above 15% can create problems with respect to product stability. Likewise, the use of aqueous sorbitol at levels above 15% can also create processability problems. This is due, it is believed, to the water content contained in the aqueous sorbitol.

Additionally, there are problems with respect to at least certain chewing gum formulations when using sorbitol in an aqueous solution. Because typical aqueous sorbitol solutions contain about 30% water, the water added with the sorbitol is detrimental to moisture sensitive ingredients when sorbitol solution is provided at high levels in chewing gum. A further difficulty with aqueous sorbitol is that it readily crystallizes and causes the gum to become brittle. While hydrogenated starch hydrolysate (HSH), such as Lycasin brand HSH from Roquette, contains a small amount of sorbitol, it does not provide a significant amount of sorbitol such that HSH can be substituted for crystalline sorbitol. It is believed that Lycasin brand HSH contains, on a dry basis, about 6% sorbitol, about 52% maltitol and about 42% of oligosaccharides having a degree of polymerization ("DP") of 3 or greater.

U.S. Pat. No. 5,651,936 discloses a unique syrup composition containing aqueous sorbitol, a plasticizer agent, and an anticrystalizing agent. This composition was designed to use aqueous sorbitol as a less expensive form of sorbitol, but overcoming the foregoing problems. While this syrup was successfully used in chewing gum compositions used to make stick forms of chewing gum products, its use in other forms, particularly coated pellet gum, at a level great enough to be economically advantageous, was not satisfactory.

U.S. Patent Application Publication No. 2004/0234648 discloses a syrup containing sorbitol, a plasticizing agent and HSH, and its use in chewing gum. The plasticizing agent is selected from glycerin, propylene glycol and mixtures thereof. While this syrup was found useful because it could be used to make both stick and coated pellet gum products, the gum pellets made from compositions containing this syrup have been found to have a coating that does not stay as hard and crunchy as desired over a long shelf life. Also, products made with this syrup develop cracks during their shelf life.

While other gum compositions can be used to form pellets that have a coating that stays crunchy over a long period of time, they do not use the low cost form of sorbitol. Thus it would be advantageous if a syrup made with the low cost form of sorbitol could be developed that could be used in chewing gum compositions that could then be made into pellet products with a crunchy shell that did not get soft over time. There is therefore a need for a sugarless syrup that allows sorbitol in a non-crystalline state to be added to a chewing gum formulation that can be made into coated gum pellets that does not cause the coating on the pellets to get soft over a desirably long shelf life.

BRIEF SUMMARY

The present invention provides a sugarless syrup that can be used in coated pellet chewing gum products, providing lower cost and improved chewing gum compositions for making into pellets, without causing the coating to get soft in a short amount of time. The syrup can be used at levels that are high enough that the cost savings justify its use. Surprisingly, the syrup can be made with very low moisture levels and yet not crystallize. The low moisture levels make the syrup particularly useful because then large amounts of it can be used without adding too much unwanted moisture to a chewing gum composition. Even more surprising, plasticizers that were used at high levels in prior syrups can be drastically reduced and even eliminated in some embodiments of the invention and the product is still fluid enough that it can be easily mixed, stored, pumped and used in commercial chewing gum production.

In one aspect, the invention is an aqueous syrup for use in chewing gum comprising, on a dry basis: a) greater than about 98% polyols, of which about 50% to about 90% is sorbitol, about 3% to about 30% is maltitol, about 2% to about 20% are polyols, other than sorbitol and maltitol, with a degree of polymerization (DP) of 1 or 2, and less than about 20% (or even less than 12%) are polyols with a DP of 3 or greater; and b) less than about 1.0% plasticizing agent selected from glycerin, propylene glycol and mixtures thereof.

In a second aspect, the invention is a syrup composition prepared from a sorbitol solution, maltitol, and one or more polyols selected from the group consisting of mannitol, xylitol, lactitol, erythritol, hydrogenated isomaltulose, and combinations thereof; wherein the one or more polyols are present in the syrup at a level of about 2% to about 20% on a dry weight basis, the sorbitol is present in the syrup at a level of at least 50% on a dry weight basis, and the syrup contains between about 2% and about 4% water and less than 1.0% plasticizer.

In a third aspect, the invention is a method of making a syrup for use in chewing gum products comprising the steps of: providing sorbitol in a first aqueous solution having a solids content of at least about 50% sorbitol and about 30% to about 50% water; providing maltitol, optionally in a second aqueous solution containing at least 25% (and perhaps even at least 50%) maltitol and about 20% to about 30% water; mixing the first solution, maltitol and one or more additional polyols having a DP of 1 or 2, other than sorbitol and maltitol, to form a mixture; and removing moisture from said mixture to produce a syrup having a moisture content of less than about 5% and a solids content that is at least 98% polyols.

In a fourth aspect, the invention is a chewing gum composition comprising a homogeneous mixture of gum base and a bulking agent wherein the bulking agent comprises an aqueous sugarless syrup comprising, on a dry basis, at least 50% sorbitol; about 3% to about 30% maltitol; about 2% to about 20% polyols, other than sorbitol and maltitol, with a DP of 1 or 2; and less than about 20% (and perhaps less than about 12%) hydrogenated oligosaccharides having a DP of 3 or greater; the syrup containing at least 98% polyols on a dry basis; and wherein the chewing gum composition has less than 2% moisture and the syrup comprises over 20% of the chewing gum composition.

In a fifth aspect, the invention is a method of making a chewing gum composition comprising the steps of: a) making a syrup by evaporating water from a mixture comprising an aqueous sorbitol solution containing at least 50% sorbitol; an aqueous maltitol solution containing at least 25% maltitol; and at least one polyol selected from the group consisting of mannitol, lactitol, hydrogenated isomaltulose, xylitol, erythritol and mixtures thereof, wherein the final evaporated syrup composition comprises less than 5% moisture, and comprises at least 98% polyols on a dry basis, of which at least 50% is sorbitol, about 3% to about 30% is maltitol, about 2% to about 20% is the at least one polyol selected from the group consisting of mannitol, lactitol, hydrogenated isomaltulose, xylitol, erythritol and mixtures thereof, and not more than 20% (and perhaps not more than about 12%) are hydrogenated oligosaccharides having a DP of 3 or greater; and b) mixing the syrup with gum base and additional chewing gum ingredients to produce the chewing gum composition.

In a sixth aspect, the invention is a method for creating chewing gum compositions for use in making coated pellet chewing gum products comprising the steps of: a) providing a solution that comprises approximately 50% to about 90% by weight aqueous sorbitol, approximately 10% to about 30% by weight aqueous maltitol and about 2% to about 20% of one or more polyols selected from the group consisting of mannitol, lactitol, hydrogenated isomaltulose, xylitol, erythritol and mixtures thereof; b) evaporating the solution to make a syrup containing, on a dry basis, at least 98% polyols, of which at least 50% is sorbitol, about 3% to about 30% is maltitol, and about 2% to about 20% is the one or more polyols selected from the group consisting of mannitol, lactitol, hydrogenated isomaltulose, xylitol, erythritol and mixtures thereof, and c) using the syrup to make a chewing gum composition for coated pellet chewing gum products, wherein the syrup comprises about 10% to about 60% of the chewing gum composition.

An advantage of an embodiment of the present invention is that it provides an improved pellet chewing gum formulation for making coated chewing gum products that remain hard and crunchy over a long period of time. Using this embodiment of the invention, sorbitol can be used at high levels in the pellet chewing gum composition in a state other than a crystalline state. This provides a more cost effective method of adding sorbitol to a pellet chewing gum composition. However, with the syrups of the present invention, the gum pellet remains crunchy for a desired long shelf life. The syrup compositions can be made and used in commercial gum manufacturing operations.

Additional features and advantages of the present invention are described in, and will be apparent from, the detailed description of the presently preferred embodiments.

DETAILED DESCRIPTION OF THE PRESENTLY PREFERRED EMBODIMENTS

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

All percentages herein are weight percentages unless otherwise specified. As used herein, the term "chewing gum" also includes bubble gum and the like.

The present invention provides improved chewing gum formulations and methods of making chewing gum products, particularly coated chewing gum products. Pursuant to the present invention, sorbitol is provided in a non-crystalline state at high levels in pellet gum formulations, yet the coating on the pellet gum remains crunchy over a long shelf life. Of course, the syrup can be used in gum formulations made into other chewing gum products, such as stick or tab gum.

Sorbitol can be added either alone, with other sugarless sweeteners, for example, in sugarfree chewing gum, or in combination with sugar sweeteners. Additionally, the sorbitol can be provided in the chewing gum entirely in the syrup form of the present invention, or along with a crystalline form of sorbitol.

Pursuant to the present invention, the sorbitol is added to other components of a chewing gum formulation as an evaporated blend of aqueous sorbitol, maltitol and additional polyols. The blend of aqueous sorbitol is provided as a sugarless syrup. This blend can be used to reduce the usage of crystalline sorbitol in pellet chewing gum formulations. The blend can be made with little or no plasticizer, such as glycerin or propylene glycol. Even though U.S. Patent Application Publication No. 2004/0234648 suggested that glycerin should be used (albeit at lower levels than syrups such as those disclosed in U.S. Pat. No. 5,651,936) in the range about 5% to about 20%, it has now been discovered that even these low levels of glycerin have a negative impact on pellet gum coating. The removal of the glycerin from the composition of the pellet gum is believed to be the major contributor as to why the coating on the gum pellet of the present invention remains hard and crunchy over an extended shelf life. Surprisingly, however, the syrup can contain low levels of moisture and still be stored and pumped. Further, even though large amounts of hydrogenated starch hydrolysates with a DP of 3 or greater are not used, and the syrup contains at least 98% polyols on a dry basis, the syrup does not crystallize even when stored for one week or more at a temperature of 60° C. or 65° C.

One syrup of the present invention comprises, on a dry basis, about 50% to about 90% sorbitol, about 3% to about 30% maltitol, about 2% to about 20% polyols, other than sorbitol and maltitol, which have a DP of 1 or 2, and less than about 20% polyols with a DP of 3 or greater. The syrup may comprise, on a dry basis, about 70% to about 90% sorbitol, about 5% to about 20% maltitol, and about 4% to about 15% polyols other than sorbitol and maltitol with a DP of 1 or 2. The syrup will contain about 0.5% to about 5% water. In some embodiments the water content of the syrup will be between about 2.3% and about 3%. For some purposes, the syrup will comprise less than about 1.0% plasticizing agent, more preferably less than 0.5% plasticizing agent. A particular embodiment of the syrup contains, on a dry basis, about 69% sorbitol, about 14% maltitol; about 7% polyols other than sorbitol and maltitol having a DP of 1 or 2, and about 0.1% to about 20% polyols having a DP of 3 or greater, and no plasticizer. In some embodiments the level of polyols having a DP of 3 or greater is less than 12% of the total polyols.

Sorbitol for use in the inventive syrup will preferably be provided initially in the form of an aqueous solution. The aqueous sorbitol solution will preferably contain at least 50% sorbitol, more preferably about 60% sorbitol, and most preferably about 70% sorbitol. Preferably the remainder of the solution is water. A commonly available sorbitol solution is Neosorb 70/02 from Roquette, which contains 70% sorbitol and about 30% water. It is believed that there are small amounts (about 0.75% to about 1.5%) of mannitol in this typical sorbitol solution by way of an impurity.

Maltitol syrup used in the invention will often have a high percentage of maltitol and a low level of other polyols. One such syrup is maltitol syrup C16303 from Cerestar, in which maltitol comprises over 50% of the polyols in the syrup. This syrup is believed to contain, on a dry basis, about 52.5% maltitol, about 5% sorbitol, and about 42.5% polyols having a DP of 3 or greater, and is further believed to be similar to Lycasin brand HSH from Roquette in its distribution of polyols with a DP of 3 or greater. Another suitable maltitol syrup is maltitol syrup H163K9, also available from Cerestar, in which the polyols in the syrup are believed to comprise 96.5% maltitol, 1% sorbitol and 2.5% polyols having a DP of 3 or greater. Both of these syrups initially contain about 25% to about 30% water. Other maltitol syrups may have a lower percentage of maltitol and a higher percentage of other polyols, but still contain at least 25% maltitol. A third syrup is Stabilite 1 Polyglycitol from SPI Polyols, New Castle, Del., which is believed to contain about 8% sorbitol, about 35% maltitol and about 57% polyols having a DP of 3 or greater, and about 23% to about 28% water. A fourth syrup is Hystar 4075 HSH (polyglycitol syrup) also from SPI Polyols, New Castle, Del., which is believed to contain about 13% sorbitol, about 34% maltitol and about 53% polyols having a DP of 3 or greater, and about 25% water.

While a plasticizing agent is not desirable, small amounts of a plasticizing agent may be included in the syrup. Such plasticizing agents may be selected from the group consisting of glycerin, propylene glycol and mixtures thereof. Usually the syrup will contain less than 1.0% plasticizing agent. On the other hand, the syrup, on a dry basis, will contain 98% polyols, and may contain 100% polyols. In that regard, the total glycerin in the gum pellet composition, either from the syrup or added separately, should be less than 1% of the gum composition.

Normally the syrup will be stored at a temperature of at least 60° C., and more usually at 65° C., until it is to be used. In some instances it will be preferable to cool the syrup down to 50° C. before mixing it with the other chewing gum ingredients.

Generally, to make the aqueous sugarless syrup of the present invention, aqueous sorbitol, a maltitol syrup and one or more polyols having a DP of 1 or 2 are mixed together and then coevaporated under vacuum to create a syrup. Preferably, the syrup combination is evaporated so that it contains not more than 5% water. More preferably, the mixture is evaporated so that it contains no more than 4% water, even more preferably no more than about 3% water, and most preferably about 2.3% to about 3% water.

While a maltitol syrup will typically be used to make the inventive syrup, it is of course possible to make the syrup from a sorbitol solution with maltitol added as a powder, to provide the specified maltitol level. While maltitol powder may be more expensive than maltitol syrup, the use of a powder lowers the cost of evaporating moisture that is also added with the maltitol syrup.

Pellet gum centers require sufficient toughness and robustness so that the pellet centers can be coated in panning equipment. In addition, even the moderate glycerin content of the syrup described in U.S. Patent Application Publication No. 2004/0234648 has been found to cause a loss in shelf life of coated pellet gums due to glycerin migration and absorption of moisture, causing the gum pellets to lose their crunch and have poor shelf life.

On the other hand, the preferred sugarless syrup of the present invention can be used in pellet gum and provide the overall quality needed for manufacturing and consumer acceptance.

The new sugarless syrup surprisingly does not crystallize and can be stored and pumped at the same temperature used for the syrup disclosed in U.S. Patent Application Publication No. 2004/0234648, even though it does not contain a plasticizer, has a low moisture level, and does not contain large amounts of polyols having a DP of 3 or greater. It is believed that the polyols with a DP of 1 or 2, in conjunction with the maltitol, prevents the sorbitol from crystallizing. It is also believed possible to replace the maltitol with another polyol having a DP of 1 or 2 other than sorbitol, such as hydrogenated isomaltulose, so long as there are at least three different polyols in the syrup in sufficient amounts to prevent the sorbitol from crystallizing at the low moisture levels specified.

The aqueous sorbitol, maltitol and other polyol(s) having a DP of 1 or 2 can be provided in different combinations and ratios. The syrup may be made from a mixture of aqueous sorbitol solution, maltitol syrup and polyols other than maltitol and sorbitol that have a DP of 1 or 2. These other polyols may be selected from the group consisting of mannitol, xylitol, lactitol, erythritol, hydrogenated isomaltulose, and combinations thereof.

Pursuant to the present invention, the aqueous sorbitol syrup can be used to create sugarless chewing gums, because sugarless chewing gum typically contains sorbitol. However, it should be noted that the present invention can be used to create any chewing gum that includes sorbitol. Likewise, the inventive sugarless syrup can be used in other products that use sorbitol. Such products include confectioneries, medicaments, beverages and food products.

Chewing gum generally consists of a water insoluble gum base, a water soluble portion, and flavors. The water soluble portion dissipates with a portion of the flavor over a period of time during chewing. The gum base portion is retained in the mouth throughout the chew.

The insoluble gum base generally comprises elastomers, resins, fats and oils, softeners, and inorganic fillers. The gum base may or may not include wax. The insoluble gum base can constitute approximately 5% to about 95% of the chewing gum. More commonly, the gum base comprises 10% to about 50% of the gum, and, in some preferred embodiments, 20% to about 35% of the chewing gum.

In an embodiment, the chewing gum base of the present invention contains about 20% to about 60% synthetic elastomer, 0% to about 30% natural elastomer, about 5% to about 55% elastomer plasticizer, about 4% to about 35% filler, about 5% to about 35% softener, and optional minor amounts (about one percent or less) of miscellaneous ingredients such as colorants, antioxidants, etc.

Synthetic elastomers may include, but are not limited to, polyisobutylene with a GPC weight average molecular weight of about 10,000 to about 95,000, isobutylene-isoprene copolymer (butyl elastomer), styrene-butadiene copolymers having styrene-butadiene ratios of about 1:3 to about 3:1, polyvinyl acetate having a GPC weight average molecular weight of about 2,000 to about 90,000, polyisoprene, polyethylene, vinyl acetate-vinyl laurate copolymer having vinyl laurate content of about 5% to about 50% of the copolymer, and combinations thereof.

Preferred ranges are, for polyisobutylene, 50,000 to 80,000 GPC weight average molecular weight; for styrene-butadiene, 1:1 to 1:3 bound styrene-butadiene; for polyvinyl acetate, 10,000 to 65,000 GPC weight average molecular weight, with the higher molecular weight polyvinyl acetates typically used in bubble gum base; and for vinyl acetate-vinyl laurate, vinyl laurate content of 10-45%.

Natural elastomers may include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, and combinations thereof. The preferred synthetic elastomer and natural elastomer concentrations vary depending on whether the chewing gum in which the base is used is adhesive or conventional, bubble gum or regular gum, as discussed below. Preferred natural elastomers include jelutong, chicle, sorva and massaranduba balata.

Elastomer plasticizers may include, but are not limited to, natural rosin esters such as glycerol esters of partially hydrogenated rosin, glycerol esters of polymerized rosin, glycerol esters of partially dimerized rosin, glycerol esters of rosin, pentaerythritol esters of partially hydrogenated rosin, methyl and partially hydrogenated methyl esters of rosin, pentaerythritol esters of rosin; synthetics such as terpene resins derived from alpha-pinene, beta-pinene, and/or d-limonene; and any suitable combinations of the foregoing. The preferred elastomer plasticizers will also vary depending on the specific application and on the type of elastomer which is used.

Fillers/texturizers may include magnesium and calcium carbonate, ground limestone, silicate types such as magnesium and aluminum silicate, clay, alumina, talc, titanium oxide, mono-, di- and tri-calcium phosphate, cellulose polymers, such as wood, and combinations thereof.

Softeners/emulsifiers may include tallow, hydrogenated tallow, hydrogenated and partially hydrogenated vegetable oils, cocoa butter, glycerol monostearate, glycerol triacetate, lecithin, mono-, di- and triglycerides, acetylated monoglycerides, fatty acids (e.g. stearic, palmitic, oleic and linoleic acids), and combinations thereof.

Colorants and whiteners may include FD&C-type dyes and lakes, fruit and vegetable extracts, titanium dioxide, and combinations thereof.

The base may or may not include wax. An example of a wax-free gum base is disclosed in U.S. Pat. No. 5,286,500, the disclosure of which is incorporated herein by reference.

In addition to a water insoluble gum base portion, a typical chewing gum composition includes a water soluble bulk portion and one or more flavoring agents. The syrup of the present invention, containing water soluble ingredients, forms part of the water soluble bulk portion. The water soluble portion can also include powdered bulking agents (most typically bulk sweeteners), high-intensity sweeteners, flavoring agents, softeners, emulsifiers, colors, acidulants, fillers, antioxidants, and other components that provide desired attributes.

Softeners are added to the chewing gum in order to optimize the chewability and mouth feel of the gum. The softeners, which are also known as plasticizers and plasticizing agents, generally constitute between approximately 0.5% to about 15% of the chewing gum. The softeners may include triacitin, lecithin, emulsifiers, and combinations thereof. Aqueous sweetener solutions such as those containing sorbitol, hydrogenated starch hydrolysate, corn syrup and combinations thereof, may also be used as softeners and binding agents in chewing gum. Thus, the sugarless syrup of the present invention can be used as a softener and binding agent.

Bulk sweeteners include both sugar and sugarless components. Bulk sweeteners and other bulking agents typically constitute about 5% to about 95% by weight of the chewing gum, more typically, about 20% to about 80% by weight, and more commonly, about 30% to about 60% by weight of the gum.

Sugar sweeteners generally include saccharide-containing components commonly known in the chewing gum art, including, but not limited to, sucrose, dextrose, maltose, dextrin, dried invert sugar, fructose, levulose, galactose, corn syrup solids, and the like, alone or in combination.

Generally, the sugarless syrup of the present invention comprises about 10% to about 65% of the chewing gum formulation. Typically the syrup will comprise about 20% to about 55% of pellet chewing gum compositions. For pellet chewing gum compositions, the preferred syrup level is at least about 30%, more preferably at least about 35% and most preferably more than 40% of the gum composition. Preferably the syrup will comprise approximately 40% to about 65% of stick chewing gum compositions. Typically the syrup may comprise more than 45% of the gum, and most preferably more than 50% of the gum composition when used to make stick gum.

As noted above, in addition to the sugarless syrup of the present invention, crystalline sorbitol, if desired, can also be used. Additionally, sugarless sweeteners can include, but are not limited to, other sugar alcohols such as mannitol, xylitol, hydrogenated starch hydrolysate, maltitol, and the like, alone or in combination.

High-intensity artificial sweeteners can also be used in combination with the above. Preferred sweeteners include, but are not limited to sucralose, aspartame, salts of acesulfame, alitame, saccharin and its salts, cyclamic acid and its salts, glycyrrhizin, dihydrochalcones, thaumatin, monellin, and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extension may be used to achieve the desired release characteristics.

Usage level of the artificial sweetener will vary greatly and will depend on such factors as potency of the sweetener, rate of release, desired sweetness of the product, level and type of flavor used and cost considerations. Thus, the active level of artificial sweetener may vary from 0.02 to about 8%. When carriers used for encapsulation are included, the usage level of the encapsulated sweetener will be proportionately higher.

Combinations of sugar and/or sugarless sweeteners may be used in chewing gum. Additionally, the softener may also provide additional sweetness such as with aqueous sugar or alditol solutions.

If a low calorie gum is desired, a low caloric bulking agent can be used. Example of low caloric bulking agents include: polydextrose, Raftilose, Raftilin, fructooligosaccharides (NutraFlora), palatinose oligosaccharide, guar gum hydrolysate (Sun Fiber), and indigestible dextrin (Fibersol). However, other low calorie bulking agents can be used.

A variety of flavoring agents can be used. The flavor can be used in amounts of approximately 0.1% to about 15% of the gum, and preferably, about 0.2% to about 5%. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

The present invention, it is believed, can be used with a variety of processes for manufacturing chewing gum.

Chewing gum is generally manufactured by sequentially adding the various chewing gum ingredients to commercially available mixers known in the art. After the ingredients have been thoroughly mixed, the chewing gum mass is discharged from the mixer and shaped into the desired form, such as by rolling into sheets and cutting into sticks, extruding into chunks, or casting into pellets.

Generally, the ingredients are mixed by first melting the gum base and adding it to the running mixer. The gum base may alternatively be melted in the mixer. Color and emulsifiers can be added at this time.

The sugarless syrup of the present invention can be added next along with any other syrup softeners or bulking agents. Any bulk powdered sweeteners may be added in next, or divided and part added in at different times. Flavoring agents are typically added with the final part of any bulk sweetener. The entire mixing process typically takes from 5 to 15 minutes, although longer mixing times are sometimes required. Those skilled in the art will recognize that variations of this general mixing procedure, or other mixing procedures, can be followed.

The entire mixing procedure typically takes from five to fifteen minutes, but longer mixing times may sometimes be required. Those skilled in the art will recognize that many variations of the above described procedure may be followed.

In this invention, pellets of gum are prepared as conventional chewing gum but formed into pellets that are balls or pillow-shaped. The pellets can be then polyol coated or panned by conventional panning techniques to make a unique coated pellet gum. The weight of the coating may be about 20% to about 50% of the weight of the finished product, but may be as much as 75% of the total gum product.

Conventional panning procedures generally coat with sucrose, but advances in panning have allowed use of other carbohydrate materials to be used in place of sucrose. Some of these components include, but are not limited to, dextrose, maltose, palatinose, xylitol, lactitol, hydrogenated isomaltulose, erythritol, maltitol, and other new polyols or combinations thereof. These materials may be blended with panning modifiers including, but not limited to, gum arabic, maltodextrins, corn syrup, gelatin, cellulose type materials like carboxymethyl cellulose or hydroxymethyl cellulose, starch and modified starches, vegetables gums like alginates, locust bean gum, guar gum, and gum tragacanth, insoluble carbonates like calcium carbonate or magnesium carbonate and talc. Antitack agents may also be added as panning modifiers, which allow the use of a variety of carbohydrates and polyols to be used in the development of new panned or coated gum products. Flavors may also be added with the sugar or sugarless coating and with the active to yield unique product characteristics.

The coating may contain ingredients such as flavoring agents, as well as artificial sweeteners and dispersing agents, coloring agents, film formers and binding agents. Flavoring agents contemplated by the present invention include those commonly known in the art such as essential oils, synthetic flavors or mixtures thereof, including but not limited to oils derived from plants and fruits such as citrus oils, fruit essences, peppermint oil, spearmint oil, other mint oils, clove oil, oil of wintergreen, anise and the like. The flavoring agents may be used in an amount such that the coating will contain from about 0.2% to about 3% flavoring agent, and preferably from about 0.7% to about 2.0% flavoring agent.

Artificial sweeteners contemplated for use in the coating include but are not limited to synthetic substances, saccharin, thaumatin, alitame, saccharin salts, aspartame, N-substituted APM derivatives such as neotame, sucralose and acesulfame-K. The artificial sweetener may be added to the coating syrup in an amount such that the coating will contain from about 0.01% to about 0.5%, and preferably from about 0.1% to about 0.3% artificial sweetener.

Dispersing agents are often added to syrup coatings for the purpose of whitening and tack reduction. Dispersing agents contemplated by the present invention to be employed in the coating syrup include titanium dioxide, talc, or any other antistick compound. Titanium dioxide is a presently preferred dispersing agent of the present invention. The dispersing agent may be added to the coating syrup in amounts such that the coating will contain from about 0.1% to about 1.0%, and preferably from about 0.3% to about 0.6% of the agent.

Coloring agents are preferably added directly to the syrup in the dye or lake form. Coloring agents contemplated by the present invention include food quality dyes. Film formers preferably added to the syrup include methyl cellulose, gelatins, hydroxypropyl cellulose, ethyl cellulose, hydroxyethyl cellulose, carboxymethyl cellulose and the like and combinations thereof. Binding agents may be added either as an initial coating on the chewing gum center or may be added directly into the syrup. Binding agents contemplated by the present invention include gum arabic, gum talha (another type of acacia), alginate, cellulosics, vegetable gums and the like.

The coating is initially present as a liquid syrup which contains from about 30% to about 80% or 85% of the coating ingredients previously described herein, and from about 15% or 20% to about 70% of a solvent such as water. In general, the coating process is carried out in a rotating pan. Gum center tablets to be coated are placed into the rotating pan to form a moving mass.

The material or syrup which will eventually form the coating is applied or distributed over the gum center tablets. Flavoring agents may be added before, during and after applying the syrup to the gum centers. Once the coating has dried to form a hard surface, additional syrup additions can be made to produce a plurality of coatings or multiple layers of hard coating.

In a hard coating panning procedure, syrup is added to the gum center tablets at a temperature range of from about 100° F. to about 240° F. Mostly, the syrup temperature is from about 130° F. to about 200° F. throughout the process in order to prevent the polyol or sugar in the syrup from crystallizing. The syrup may be mixed with, sprayed upon, poured over, or added to the gum center tablets in any way known to those skilled in the art.

In general, a plurality of layers is obtained by applying single coats, allowing the layers to dry, and then repeating the process. The amount of solids added by each coating step depends chiefly on the concentration of the coating syrup. Any number of coats may be applied to the gum center tablet. Generally, no more than about 75-100 coats are applied to the gum center pellets. The present invention contemplates applying an amount of syrup sufficient to yield a coated comestible containing about 10% to about 75% coating.

Those skilled in the art will recognize that in order to obtain a plurality of coated layers, a plurality of premeasured aliquots of coating syrup may be applied to the gum center pellets. It is contemplated, however, that the volume of aliquots of syrup applied to the gum center pellets may vary throughout the coating procedure.

Once a coating of syrup is applied to the gum center pellets, the present invention contemplates drying the wet syrup in an inert medium. A preferred drying medium comprises air. Forced drying air contacts the wet syrup coating in a temperature range of from about 70° to about 115° F. Generally, the drying air is in the temperature range of from about 80° to about 100° F. The invention also contemplates that the drying air possesses a relative humidity of less than about 15 percent. Preferably, the relative humidity of the drying air is less than about 8 percent.

The drying air may be passed over and admixed with the syrup coated gum centers in any way commonly known in the art. Generally, the drying air is blown over and around or through the bed of the syrup coated gum centers at a flow rate, for large scale operations, of about 2800 cubic feet per minute. If lower quantities of material are being processed, or if smaller equipment is used, lower flow rates would be used.

For many years, flavors have been added to a sugar coating of pellet gum to enhance the overall flavor of gum. This same practice can be used with sugarless coatings. These flavors include spearmint flavor, peppermint flavor, wintergreen flavor, and fruit flavors. These flavors are generally preblended with the coating syrup just prior to applying it to the core or added together to the core in one or more coating applications in a revolving pan containing the cores. Generally, the coating syrup is very hot, about 130° to 200° F., and the flavor may volatilize if preblended with the coating syrup too early.

The concentrated coating syrup is applied to the gum cores as a hot liquid, the sugar or polyol allowed to crystallize, and the coating then dried with warm, dry air. This is repeated in about 30 to 100 applications to obtain a hard shell coated product having an increased weight gain of about 40% to 75%. A flavor is applied with one, two, three or even four or more of these coating applications. Each time flavor is added, several non-flavored coatings are applied to cover the flavor before the next flavor coat is applied. This reduces volatilization of the flavor during the coating process.

For mint flavors such spearmint, peppermint and wintergreen, some of the flavor components are volatilized, but sufficient flavor remains to give a product having a strong, high impact flavor. Fruit flavors, that may contain esters, are more easily volatilized and may be flammable and/or explosive and therefore, generally these type of fruit flavors may be pretreated in order to be able to add them to a gum coating.

EXAMPLES 1-5

Sugarless syrups were made by combining a 70% sorbitol solution (Neosorb™ 70/02 from Roquette), a maltitol syrup (C16303 (for Examples 1, 2 and 3) or H163K9 (for Examples 4, 5 and 6) from Cerestar) and one or more polyols in the form of powders. The powdered polyols and the proportions of the materials used on a wet basis are given in Table I below. The powders were dissolved into the mixture of solution and syrup, and the mixture heated until a desired final temperature was reached. A vacuum was then applied to remove additional moisture. The final temperature and duration of the application of the vacuum after the final temperature was reached are also given for Example 2-6 in Table I. The water level in the resulting solution was measured by a Karl Fischer moisture analysis. The moisture content of the syrup and the dry solids composition are also given in Table I. The dry solids composition is calculated taking into account the sorbitol and hydrogenated oligosaccharides having a DP of 3 or greater in the maltitol syrups (approximately 52.5% maltitol, 5% sorbitol and 42.5% DP3+ in C16303 (in solution with 25% water); and about 96.5% maltitol, 1% sorbitol and 2.5% DP3+ in H163K9 (in solution with about 30% water)). However, the small amount of mannitol in the sorbitol solution is not taken into account in the numbers reported in Table I.

TABLE I

|  | Example 1 | Example 2 | Example 3 | Example 4 | Example 5 | Example 6 |
| --- | --- | --- | --- | --- | --- | --- |
| Wet Basis % | | | | | | |
| Sorbitol solution | 61.0 | 69.94 | 66.15 | 80.0 | 83.3 | 87.0 |
| Maltitol syrup | 25.0 | 25.29 | 25.29 | 15.0 | 6.7 | 4.0 |
| Mannitol | 1.3 | 0.98 | 0.98 | 5.0 | 5.0 | 3.0 |
| Hydrogenated Isomaltulose | 5.0 | 3.79 | 7.58 | — | 5.0 | 3.0 |
| Xylitol | 5.0 | — | — | — | — | 3.0 |
| Final Cooking Temp. (° F.) | | 337 | 320 | 330 | 334 | 330 |
| Vacuum Application Time (Min.) | | 10 | 5 | 5 | 3 | 5 |
| Moisture Content (%) | 2.7 | 2.22 | 2.68 | 2.67 | 2.88 | 2.54 |
| Dry Basis % | | | | | | |
| Sorbitol | 59.8 | 68.7 | 64.0 | 78.6 | 80.0 | 83.8 |
| Maltitol | 13.8 | 13.6 | 13.5 | 14.0 | 6.2 | 3.7 |
| Mannitol | 1.8 | 1.4 | 1.3 | 7.0 | 6.8 | 4.1 |
| Hydrogenated Isomaltulose | 6.9 | 5.2 | 10.3 | — | 6.8 | 4.1 |
| Xylitol | 6.9 | — | — | — | — | 4.1 |
| DP 3+ | 10.8 | 11.1 | 10.9 | 0.4 | 0.2 | 0.1 |

The sugarless syrup of Example 1 was stored at 65° C. for 4 weeks and showed no crystallization. It was then used at a level of 30% in a gum formulation. The gum processed well and had a texture similar to a control gum that contained 4% glycerin in the formula. The sugarless syrups of Examples 2-6 were put into jars and stored in an oven at 65° C. for over a week with no signs of crystallization.

Any of the inventive sugarless syrups of Examples 1-6 above can be used in a variety of pellet gum formulations as in Table II.

TABLE II

|  | Example 7 | Example 8 | Example 9 | Example 10 | Example 11 | Example 12 |
| --- | --- | --- | --- | --- | --- | --- |
| Sorbitol | 26.3 | 16.3 | 19.0 | 9.0 | 34.7 | 29.7 |
| Inventive Sugarless Syrup | 25.0 | 35.0 | 30.0 | 40.0 | 30.0 | 35.0 |
| Gum Base | 33.0 | 33.0 | 33.0 | 33.0 | 29.0 | 29.0 |
| Calcium Carbonate | 13.0 | 13.0 | 15.0 | 15.0 | 4.0 | 4.0 |
| Mint Flavor | 2.0 | 2.0 | — | — | — | — |
| Wintergreen Flavor | — | — | 2.5 | 2.5 | — | — |
| Spearmint Flavor | — | — | — | — | 1.6 | 1.6 |
| High-Intensity Sweetener | 0.1 | 0.1 | — | — | 0.1 | 0.1 |
| Encapsulated High-Intensity Sweetener | 0.6 | 0.6 | 0.5 | 0.5 | 0.6 | 0.6 |
| Total | 100.0 | 100.0 | 100.0 | 100.0 | 100.0 | 100.0 |

These center formulas can be coated with a variety of alditol sweeteners such as xylitol, isomalt, maltitol, lactitol, or sorbitol to yield coated sugarless products with good quality texture. The following table gives coating formulations with maltitol for the various centers of the examples in Table II.

TABLE III

|  | Examples 13 & 14 | Examples 15 & 16 | Examples 17 & 18 |
| --- | --- | --- | --- |
| Example 7 and 8 centers | 67.5 | — | — |
| Example 9 and 10 centers | — | 67.5 | — |
| Example 11 and 12 centers | — | — | 67.5 |
| Maltitol (from syrup) | 25.41 | 26.41 | 27.46 |
| Maltitol Powder | 3.93 | 2.93 | 1.93 |
| Gum Arabic | 2.56 | 2.56 | 2.56 |
| Titanium Dioxide | 0.20 | 0.20 | 0.20 |
| Flavor | 0.20 | 0.20 | 0.15 |
| High-Intensity Sweetener | 0.10 | 0.10 | 0.10 |
| Wax & Talc (for polishing) | 0.10 | 0.10 | 0.10 |
| Total | 100.0 | 100.0 | 100.0 |

EXAMPLES 19-20

Additional sugarless syrups can be made by combining a 70% sorbitol solution (Neosorb™ 70/02 from Roquette), an HSH syrup (Stabilite 1 Polyglycitol HSH from SPI Polyols (for Example 19) or a similar HSH solution not containing any sorbitol (for Example 20)) and one or more polyols in the form of powders. The powdered polyols and the proportions of the materials to be used on a wet basis are given in Table IV below. The powders are dissolved into the mixture of solution and syrup, and the mixture heated until a desired final temperature is reached. A vacuum is then applied to remove additional moisture. The final temperature and duration of the application of the vacuum after the final temperature is reached are also given in Table IV. The moisture content of the syrup and the dry solids composition are also given in Table IV. The dry solids composition is calculated taking into account the sorbitol and hydrogenated oligosaccharides having a DP of 3 or greater in the HSH syrups (approximately 35% maltitol, 8% sorbitol and 57% DP3+ in Stabilite 1 (in solution with 23-28% water); and about 38% maltitol and 62% DP3+ in the Example 20 HSH syrup (in solution with about 23-28% water)). However, the small amount of mannitol in the sorbitol solution is not taken into account in the numbers reported in Table IV.

TABLE IV

|  | Example 19 | Example 20 |
| --- | --- | --- |
| Wet Basis % |  |  |
| Sorbitol solution | 61.0 | 61.0 |
| HSH syrup | 25.0 | 25.0 |
| Mannitol | 1.3 | 1.3 |
| Hydrogenated Isomaltulose | 5.0 | 5.0 |
| Xylitol | 5.0 | 5.0 |
| Final Cooking Temp. (° F.) | 337 | 337 |
| Vacuum Application Time (Min.) | 10 | 10 |
| Moisture Content (%) | 2.7 | 2.22 |
| Dry Basis % |  |  |
| Sorbitol | 60.15 | 58.7 |
| Maltitol | 9.25 | 9.25 |
| Mannitol | 1.8 | 1.8 |
| Hydrogenated Isomaltulose | 6.9 | 6.9 |
| Xylitol | 6.9 | 6.9 |
| DP 3+ | 15 | 16.45 |

Either of the inventive sugarless syrups of Examples 19-20 above can be used in a variety of pellet gum formulations as in Table II, and coated with variety of alditol sweeteners such as xylitol, isomalt, maltitol, lactitol, or sorbitol, such as those listed in Table III, to yield coated sugarless products with good quality texture.

It should be appreciated that the products and methods of the present invention are capable of being incorporated in the form of a variety of embodiments, only a few of which have been illustrated and described above. The invention may be embodied in other forms without departing from its spirit or essential characteristics. It will be appreciated that the addition of some other ingredients, process steps, materials or components not specifically included will have an adverse impact on the present invention. The best mode of the invention may therefore exclude ingredients, process steps, materials or components other than those listed above for inclusion or use in the invention. However, the described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

The invention claimed is:

1. An aqueous syrup for use in chewing gum comprising, on a dry basis:
   a) greater than about 98% polyols, of which
      i) about 50% to about 90% is sorbitol,
      ii) about 3% to about 30% is maltitol,
      iii) about 2% to about 20% are polyols, other than sorbitol and maltitol, with a degree of polymerization (DP) of 1 or 2, and
      iv) less than about 20% are polyols with a DP of 3 or greater; and
   b) less than about 1.0% plasticizing agent selected from glycerin, propylene glycol and mixtures thereof.

2. An aqueous syrup for use in chewing gum comprising, on a dry basis:
   a) greater than about 98% polyols, of which
      i) about 50% to about 90% is sorbitol,
      ii) about 3% to about 30% is maltitol,
      iii) about 2% to about 20% are polyols, other than sorbitol and maltitol, with a degree of polymerization (DP) of 1 or 2, and
      iv) less than about 12% are polyols with a DP of 3 or greater; and
   b) less than about 1.0% plasticizing agent selected from glycerin, propylene glycol and mixtures thereof.

3. The syrup of claim 1 wherein the syrup has a moisture content of about 0.5% to about 5%.

4. The syrup of claim 1 wherein the syrup comprises, on a dry basis; about 70% to about 90% sorbitol, about 5% to about 20% maltitol and about 4% to about 15% polyols with a DP of 1 or 2 other than sorbitol and maltitol.

5. The syrup of claim 1 wherein the syrup has about 3% or less water but does not crystallize when held at 65° C. for one week.

6. The syrup of claim 1 wherein the polyols, other than sorbitol and maltitol, with a DP of 1 or 2 are selected from the group consisting of mannitol, lactitol, hydrogenated isomaltulose, xylitol, erythritol and mixtures thereof.

7. A syrup composition prepared from a sorbitol solution, maltitol, and one or more polyols selected from the group consisting of mannitol, xylitol, lactitol, erythritol, hydrogenated isomaltulose, and combinations thereof; wherein the one or more polyols are present in the syrup at a level of about 2% to about 20% on a dry weight basis, the sorbitol is present in the syrup at a level of at least 50% on a dry weight basis, and the syrup contains between about 2% and about 4% water and less than 1.0% plasticizer.

8. The syrup of claim 7 held in storage at a temperature of about 65° C. for at least one week without undergoing crystallization.

9. A chewing gum composition comprising a homogeneous mixture of gum base and a bulking agent wherein the bulking agent comprises an aqueous sugarless syrup comprising, on a dry basis, about 50% to about 90% sorbitol; about 3% to about 30% maltitol; about 2% to about 20% polyols, other than sorbitol and maltitol, with a DP of 1 or 2; and less than about 20% hydrogenated oligosaccharides having a DP of 3 or greater; the syrup containing at least 98% polyols on a dry basis and less than about 1.0% plasticizing agent selected from glycerin, propylene glycol and mixtures thereof; and wherein the chewing gum composition has less than 2% moisture and said syrup comprises over 20% of said composition.

10. A chewing gum composition comprising a homogeneous mixture of gum base and a bulking agent wherein the bulking agent comprises an aqueous sugarless syrup comprising, on a dry basis, about 50% to about 90% sorbitol; about 3% to about 30% maltitol; about 2% to about 20% polyols, other than sorbitol and maltitol, with a DP of 1 or 2; and less than about 12% hydrogenated oligosaccharides having a DP of 3or greater; the syrup containing at least 98% polyols on a dry basis and less than about 1.0% plasticizing agent selected from glycerin, propylene glycol and mixtures thereof; and wherein the chewing gum composition has less than 2% moisture and said syrup comprises over 20% of said composition.

11. The chewing gum composition of claim 10 wherein sorbitol comprises over 60% of said syrup.

* * * * *